United States Patent
Nakashima et al.

(10) Patent No.: US 9,389,923 B2
(45) Date of Patent: Jul. 12, 2016

(54) INFORMATION PROCESSING DEVICE AND METHOD FOR CONTROLLING INFORMATION PROCESSING DEVICE

(71) Applicant: FUJITSU LIMITED, Kawasaki-shi, Kanagawa (JP)

(72) Inventors: Kohta Nakashima, Kawasaki (JP); Akira Naruse, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 212 days.

(21) Appl. No.: 14/066,737

(22) Filed: Oct. 30, 2013

(65) Prior Publication Data

US 2014/0173619 A1   Jun. 19, 2014

(30) Foreign Application Priority Data

Dec. 14, 2012  (JP) ................................ 2012-273986

(51) Int. Cl.
G06F 9/45   (2006.01)
G06F 9/48   (2006.01)
G06F 9/50   (2006.01)

(52) U.S. Cl.
CPC .............. *G06F 9/5061* (2013.01); *G06F 8/458* (2013.01); *G06F 9/4893* (2013.01); *Y02B 60/144* (2013.01)

(58) Field of Classification Search
None
See application file for complete search history.

(56) References Cited

U.S. PATENT DOCUMENTS

| | | | | |
|---|---|---|---|---|
| 2004/0216101 | A1* | 10/2004 | Burky | G06F 9/485 718/100 |
| 2007/0261053 | A1* | 11/2007 | Avkarogullari et al. | 718/100 |
| 2008/0028403 | A1* | 1/2008 | Hoover et al. | 718/100 |
| 2011/0252430 | A1* | 10/2011 | Chapman et al. | 718/107 |

FOREIGN PATENT DOCUMENTS

| | | |
|---|---|---|
| GB | 2414575 | 11/2005 |
| JP | 2001-216170 | 8/2001 |
| JP | 2005-346708 | 12/2005 |
| JP | 2006-260377 | 9/2006 |

OTHER PUBLICATIONS

Snowdon et al. Power Management and Dynamic Voltage Scaling: Myths and Facts. [online] (Sep. 16, 2005). National ICT Australia., pp. 1-7. Retrieved From the Internet <https://www.researchgate.net/profile/Gernot_Heiser/publication/247218395_Power_Management_and_Dynamic_Voltage_Scaling_Myths_and_Facts/links/00b7d53acc2c50fc62000000.pdf>.*

* cited by examiner

*Primary Examiner* — Emerson Puente
*Assistant Examiner* — Jonathan R Labud
(74) *Attorney, Agent, or Firm* — Fujitsu Patent Center

(57) ABSTRACT

The present invention includes a plurality of computing units executing a plurality of threads including a communication control thread to which a receiving process by polling is assigned. In a CPU core, a computing unit executing the communication control thread performs polling in a memory region indicating notification of arrival of data and waits for execution of the receiving process until arrival of data, and when a computing unit executing an application thread executes a process assigned to the application thread, the computing unit executing the communication control thread moves to a resource-saving mode in which the use of physical resources is suppressed.

6 Claims, 14 Drawing Sheets

FIG.4

|  | APPLICATION THREAD IN NORMAL MODE | APPLICATION THREAD IN RESOURCE-SAVING MODE |
|---|---|---|
| COMMUNICATION CONTROL THREAD IN NORMAL MODE | ACTIVE | ACTIVE |
| COMMUNICATION CONTROL THREAD IN RESOURCE-SAVING MODE | ACTIVE | POWER-SAVING |

| RESOURCE CONSUMPTION MODES OF COMMUNICATION CONTROL THREAD | RESOURCE CONSUMPTION MODES OF APPLICATION THREAD | POWER-SAVING MODES OF CPU CORE | DELAY ($\mu$ sec) | STATUS OF PROCESSING CAPABILITY OF APPLICATION THREAD |
|---|---|---|---|---|
| NORMAL MODE | NORMAL MODE | ACTIVE | 0.77 | PERFORMANCE OF APPLICATION PROCESS IS DETERIORATED |
|  | RESOURCE-SAVING MODE | ACTIVE | 0.73 | DELAY IN RECEIVING PROCESS IS SHORTER AS COMPARED TO CASE WITH APPLICATION THREAD IN NORMAL MODE |
| RESOURCE-SAVING MODE | NORMAL MODE | ACTIVE | 1.03 | RECEIVING PROCESS IS DELAYED BUT PERFORMANCE OF APPLICATION PROCESS IS MAINTAINED |
|  | RESOURCE-SAVING MODE | POWER-SAVING | 1.89 | RECEIVING PROCESS IS LARGELY DELAYED |

| OPERATION MODES OF APPLICATION THREAD | OPERATION MODES OF COMMUNICATION CONTROL THREAD | RESOURCE CONSUMPTION MODES OF APPLICATION THREAD | RESOURCE CONSUMPTION MODES OF COMMUNICATION CONTROL THREAD | STATUS OF CPU CORE |
|---|---|---|---|---|
| IDLE | IDLE | NORMAL MODE | RESOURCE-SAVING MODE | ACTIVE |
|  | MPOLL | RESOURCE-SAVING MODE | NORMAL MODE | ACTIVE |
|  | COMMUNICATION CONTROL PROCESS | RESOURCE-SAVING MODE | NORMAL MODE | ACTIVE |
| APPLICATION PROCESS | IDLE | NORMAL MODE | RESOURCE-SAVING MODE | ACTIVE |
|  | MPOLL | NORMAL MODE | RESOURCE-SAVING MODE | ACTIVE |
|  | COMMUNICATION CONTROL PROCESS | NORMAL MODE | NORMAL MODE | ACTIVE |

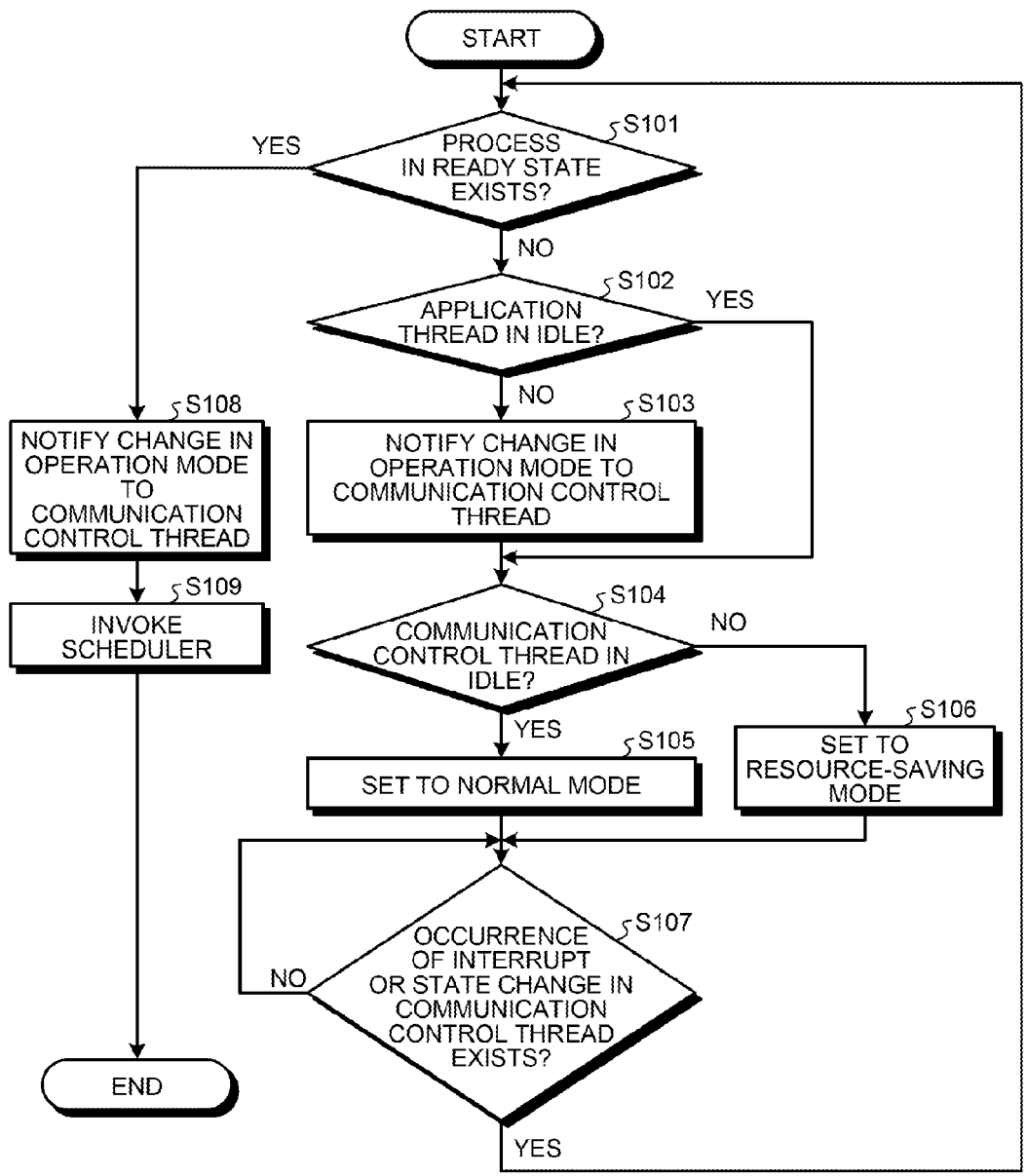

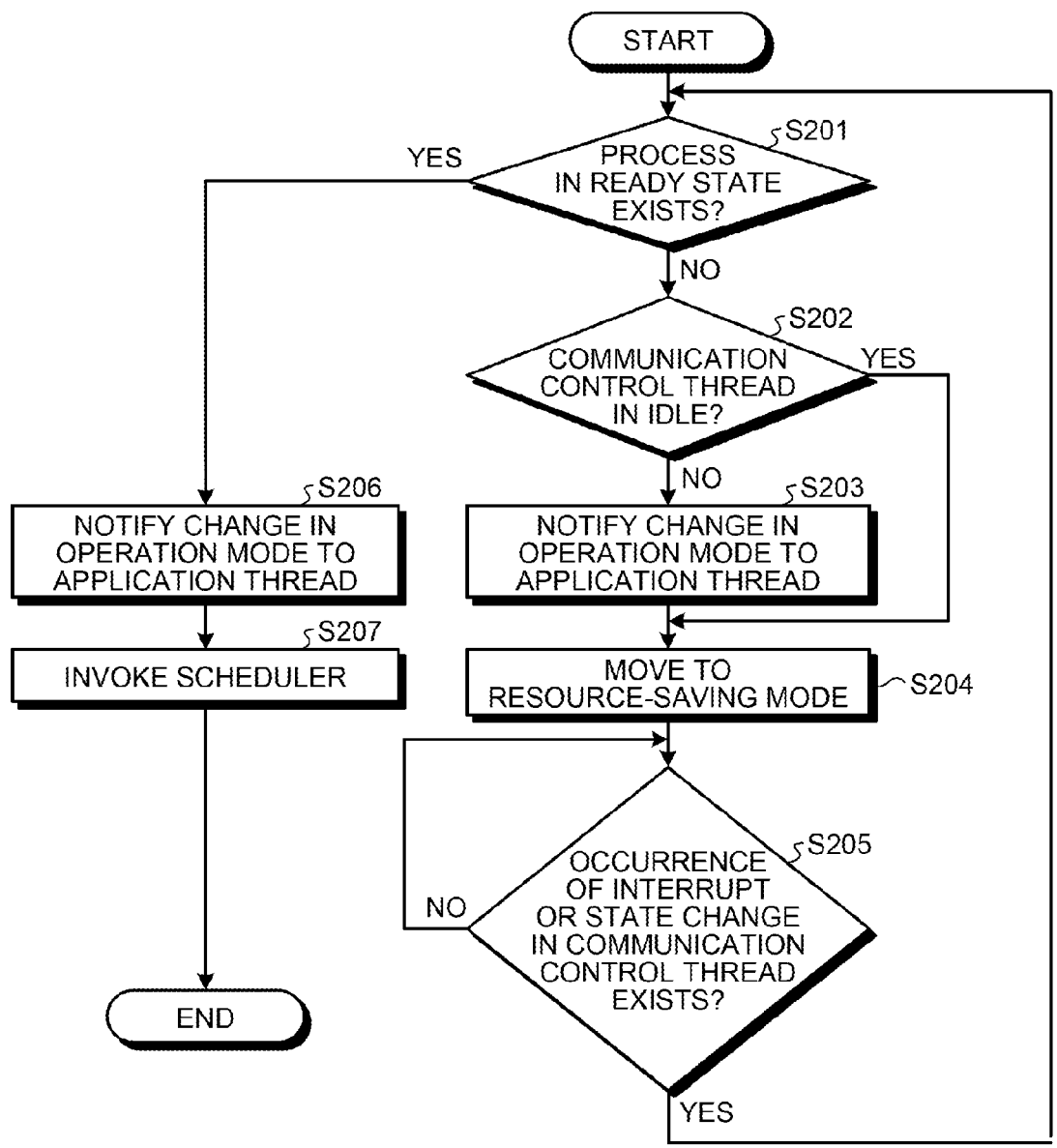

FIG.12

| APPLICATION THREAD | COMMUNI-CATION CONTROL THREAD | STATUS OF APPLICATION THREAD | STATUS OF COMMUNICATION CONTROL THREAD | STATUS OF CPU CORE |
|---|---|---|---|---|
| IDLE | IDLE | NORMAL OPERATION MODE | RESOURCE-SAVING MODE | ACTIVE |
| | MPOLL | NORMAL OPERATION MODE | RESOURCE-SAVING MODE | ACTIVE |
| | MPOLL | NORMAL OPERATION MODE | NORMAL OPERATION MODE | ACTIVE |
| PROCESS EXECUTION | IDLE | NORMAL OPERATION MODE | RESOURCE-SAVING MODE | ACTIVE |
| | MPOLL | NORMAL OPERATION MODE | RESOURCE-SAVING MODE | ACTIVE |
| | MPOLL | NORMAL OPERATION MODE | NORMAL OPERATION MODE | ACTIVE |

INFORMATION PROCESSING DEVICE AND METHOD FOR CONTROLLING INFORMATION PROCESSING DEVICE

CROSS-REFERENCE TO RELATED APPLICATION

This application is based upon and claims the benefit of priority of the prior Japanese Patent Application No. 2012-273986, filed on Dec. 14, 2012, the entire contents of which are incorporated herein by reference.

FIELD

The embodiments discussed herein are related to information processing devices, methods for controlling information processing devices, and programs for controlling information processing devices.

BACKGROUND

In recent years, there has been increasing demand in the field of business applications for improvement of response speed and the like. Business applications include applications for securities trading, database processing, game playing, and the like. In securities trading systems, for example, the acceptable range of time until consummation of a transaction was conventionally measured by the millisecond, but in recent years, has been measured by microsecond. In addition, database processing has needed higher IOPS (input/output per second). Further, in recent game playing, real-time performance has been of increasing importance, and higher-speed processing has been requested.

Because of this situation, in the field of business applications, low-delay inter-server communication techniques have been increasingly used to shorten the time of communications between servers.

As a low-delay inter-server communication technique, for example, there has been provided InfiniBand allowing communication of 1 μsec or less in one way in the field of high performance computing (HPC) with super computers.

In such a low-delay inter-server communication technique, an interruption system or polling system may be used as a reception detecting system for detection of data reception.

In the interruption system, an interrupt is generated upon receipt of data, and a data receiving process is executed with the generation of the interrupt as an impetus. Meanwhile, in the polling system, while the data receiving process is started, polling is performed to check if any data is received on a periodic basis, and when the data is received, the receiving process proceeds. In the interruption system, since the receiving process is started after generation of an interrupt, the delay may be 2 to 3 μsec. Meanwhile, in the polling system, the receiving process is started from the beginning, which makes it possible to keep the delay as shorter as 1 μsec or less than in the interruption system. However, in the polling system, a component performing process is occupied during execution of polling. For example, when processes are assigned to each of CPU (central processing unit) cores as computing units in the polling system, one CPU core is occupied by the data receiving process.

In this regard, in the case of using conventional HPC applications, the number of processes executed falls under the number of CPU cores, and thus occupation of CPU cores by the data receiving process has few harmful effects even when the detection of reception is performed in the polling system. In the case of using the case of business applications, however, the number of processes executed is large and exceeds the number of CPU cores. In this case, the occupation of CPU cores by the data receiving process may have influence on other processes.

To avoid the occupation of CPU cores, there has been suggested polling technique using SMT (simultaneous multi-threading). The SMT refers to a CPU function by which a program is divided into threads to be individually processed by CPU cores or execution units included in the CPU cores as computing units, and the threads are processed simultaneously by the plurality of CPU cores or execution units. When polling is performed using SMT, for example, the CPU cores or the execution units are operated such that one thread is used for execution of an application and another for execution of polling. The thread for polling will be hereinafter called "communication control thread." Thus, the data receiving process with polling occupies only the communication control thread, and the CPU cores or the execution units can execute applications using another thread even during execution of the polling.

There is a conventional multi-tasking technique for a plurality of CPU cores to execute different processes, by which each of the CPU cores request execution of processes from peripheral devices, and tasks of CPU cores waiting for processing results are given lower priority. In addition, there is a conventional technique by which, after a request for execution of a process is issued to an I/O driver, when a load on an operation system (OS) is equal to or less than a predetermined value, a request for an interrupt is disabled and polling is conducted on the I/O device, and then after lapse of a predetermined period of time, a request for an interrupt is enabled.

Further, there is a conventional technique by which an auxiliary processing device is provided to execute tasks instead of a main processing device, and the main processing device is shifted to a power-saving mode according to operations of the auxiliary processing device.

Patent Literature 1: Japanese Laid-open Patent Publication No. 2006-260377
Patent Literature 2: Japanese Laid-open Patent Publication No. 2001-216170
Patent Literature 3: Japanese Laid-open Patent Publication No. 2005-346708

However, even in the case of using SMT, CPU core resources are used in common by the threads. Accordingly, consumption of the CPU core resources during polling with a communication control thread may lead to deterioration in performance of the thread for executing applications.

The technique for an auxiliary processing device to execute tasks is intended to control operations in the power-saving mode corresponding to the polling status, and does not take into account the influence of polling on execution of applications. It is thus difficult to reduce influence of polling on processing of applications even with the use of this technique. In addition, the conventional technique for a plurality of CPU cores to make individual requests for processing from peripheral devices and the conventional technique for polling when a load on OS is equal to or less than a predetermined value, are targeted at multi-tasking in which each CPU core performs a process, and do not take into account the case of using SMT. Therefore, even with the use of the foregoing conventional techniques, it is difficult to achieve a balance between high communication performance and high application processing capability in the situation where a plurality of threads is operated in one CPU core such as SMT.

SUMMARY

According to an aspect of an embodiment, a information processing device includes: a plurality of computing units that executes a plurality of threads including a communication control thread to which a receiving process by polling is assigned, wherein of the computing units, a computing unit executing the communication control thread performs polling in a memory region indicating notification of arrival of data and waits for execution of the receiving process until arrival of data, and when a computing unit executing another thread executes a process assigned to the other thread, the computing unit executing the communication control thread moves to a resource-saving mode in which the use of physical resources is suppressed The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating relationships between resource consumption modes and a power-saving mode;

FIG. 5 is a diagram for describing relationships between receiving process and application process in the resource consumption modes;

FIG. 6 is a diagram for describing one example of settings of resource consumption modes of the threads according to example 1;

FIG. 7 is a flow chart of operations in idle routine of an application thread according to example 1;

FIG. 8 is a flow chart of operations in idle routine of a communication control thread according to example 1;

FIG. 12 is a diagram for describing one example of settings of resource consumption modes of threads according to example 2;

DESCRIPTION OF EMBODIMENT(S)

Preferred embodiments of the present invention will be explained with reference to accompanying drawings. However, an information processing device, a method for controlling the information processing device, and a program for controlling the information processing device disclosed in the subject application are not limited to the following examples.

[a] First Embodiment

Figure 1:
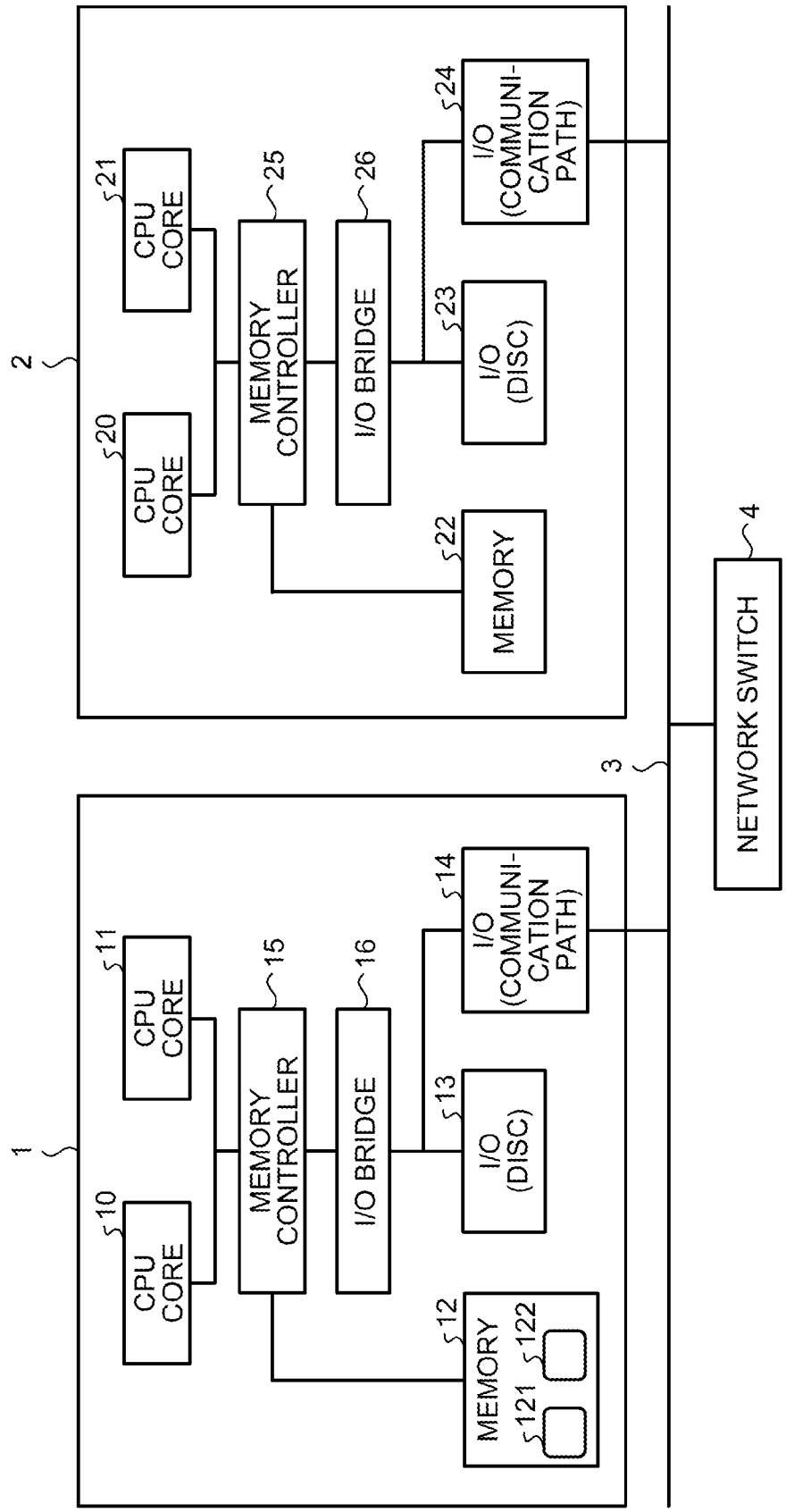
FIG. 1 is a configuration diagram illustrating a configuration of an information processing system according to example 1.

FIG. 1 is a configuration diagram illustrating a configuration of an information processing system according to example 1. As illustrated in FIG. 1, the information processing system according to the example has a server 1 and a server 2 as information processing devices.

The server 1 has CPU cores 10 and 11, a memory 12, an I/O (input/output) 13, an I/O 14, a memory controller 15, and an I/O bridge 16. The CPU cores 10 and 11 and the memory controller 15 are connected together by buses. The memory controller 15 and the memory 12 are connected together by a bus. The memory controller 15 and the I/O bridge 16 are connected together by a bus. The I/O bridge 16, and the I/O 13 and the I/O 14 are connected together by buses. In this arrangement, the I/O 13 is a disc or the like.

The I/O 14 is a communication path for InfiniBand such as a host channel adapter (HCA).

Similarly, the server 2 has CPU cores 20 and 21, a memory 22, an I/O 23, an I/O 24, a memory controller 25, and an I/O bridge 26. Connections of the components in the server 2 are the same as those in the server 1.

The server 1 and the server 2 are connected by an InfiniBand bus 3, for example. For convenience of description, in FIG. 1, the server 1 and the server 2 are connected together by the bus 3, but in actuality, the server 1 and the server 2 are connected via a switch. In addition, for convenience of description, only the two servers 1 and 2 are provided in this example. However, there is no particular limitation on the number of servers as far as there exists a plurality of servers and these servers are connected together by the bus 3 using an InfiniBand cable.

The bus 3 is connected to a network switch 4. The network switch 4 controls a transmission path of data transmitted and received via the bus 3.

Next, components of the server 1 and the server 2 will be described in detail. Since the server 1 and the server 2 are the same in configuration, the server 1 will be taken as an example in the following description.

The CPU core 10 and the CPU core 11 are computing units connected to the memory controller 15 as described above. In the example, the server 1 has the two CPU cores 10 and 11, but there is no particular limitation on the number of CPU cores. The CPU cores 10 and 11 have therein threads as units of logical hardware. In the example, the CPU cores 10 and 11 have two each threads as described later. The threads will be described later in detail.

The memory 12 has memory regions assigned to the threads in the CPU core 10 as described later. For example, a memory region 121 and a memory region 122 are assigned to the two threads in the CPU core 10.

Upon receipt of instructions from the CPU cores 10 and 11, the memory controller 15 writes data into the memory 12 or reads data from the memory 12.

The I/O 13 has a hard disc, input/output devices, and the like, for example. The input/output devices include a keyboard, a monitor, and the like. An operator inputs data or the like using the keyboard, the monitor, and the like in the I/O 13 as user interfaces. The CPU cores 10 and 11 store data in the hard disc or the like in the I/O 13 via the memory controller 15 and the I/O bridge 16.

The CPU cores 10 and 11 communicate with the CPU cores 20 and 21 in the server 2 and the like for sending and receiving data via the memory controller 15, the I/O bridge 16, the I/O 13, and the bus 3. Thus, the CPU cores 10 and 11 exchange data with the CPU cores 20 and 21 through the memory controller 15 and the I/O bridge 16. In the following description, for the sake of convenience, data transmission and reception may be described with omission of descriptions of the memory controller 15 and the I/O bridge 16.

Figure 2:
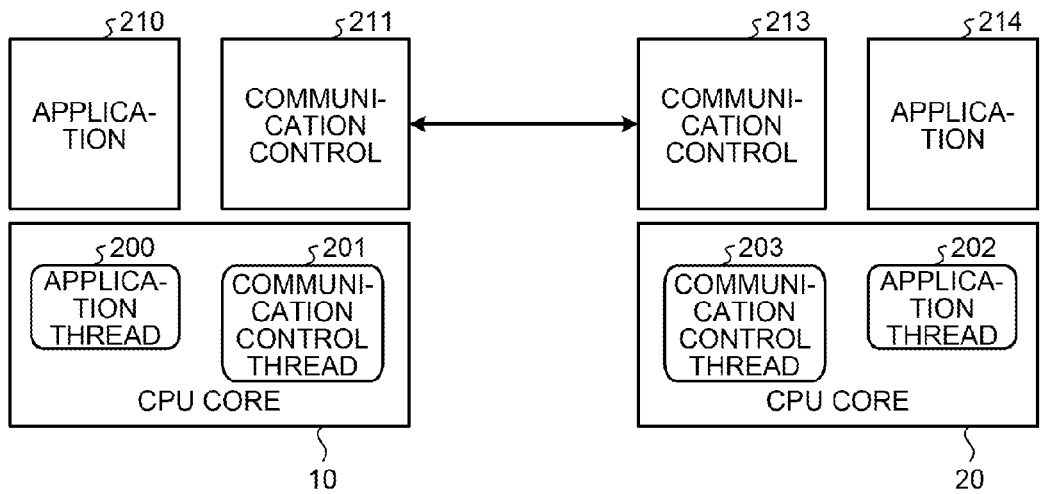
FIG. 2 is a diagram for describing threads.

FIG. 2 is a diagram for describing the threads. In the embodiment, the CPU core 10 has two threads, that is, an application thread 200 and a communication control thread 201, and the CPU core 20 has two threads, that is, an application thread 202 and a communication control thread 203. The thread is a logical unit for performing an individual process in a single CPU core. The CPU core 10 and the CPU core 20 have the function of causing each of their threads to execute processes at the same time, that is, the SMT function. The CPU cores 10 and 11 have the same configuration and the same function, and thus the CPU core 10 will be taken as an example in the following description. The following description will be made as if the threads themselves perform processes for the sake of convenience, but in actuality, computing units executing the threads perform these processes. One example of the computing units is a CPU core executing each thread or an execution unit in the CPU core.

The application thread 200 is a thread performing processes other than communication control processes in an application. For example, when an application executed in the server 1 is an application for securities trading, the CPU core 10 or the execution unit executing the application thread 200 performs a process for consummating a transaction and the like. The process performed by the application thread 200 may be hereinafter called "application process." An application 210 illustrated in FIG. 2 represents an application process performed by the CPU core 10 or the execution unit executing the application thread 200. In addition, an application 214 represents an application process performed by the CPU core 20 or the execution unit executing the application thread 202.

The CPU core 10 or the execution unit executing the application thread 200 has two operation modes, that is, a mode in which an application process is executed and a mode in which no application process is executed. In the following description, the mode in which no application process is executed will be called "Idle." In the following description, an operation mode of the CPU core 10 or the execution unit executing the application thread 200 may be called simply operation mode of the application thread 200.

A memory region is assigned to the application thread 200. In the example, the memory region 121 of the memory 12 illustrated in FIG. 1 is assigned to the application thread 200, for instance. The CPU core 10 or the execution unit which executes the application thread 200 monitors that the memory region 121 is updated.

The communication control thread 201 executed by the CPU core 10 or the execution unit is a thread performing a process of receiving data from the CPU core 20 of the server 2 or the like. For example, the CPU core 10 or the execution unit executing the communication control thread 201 receives data transmitted from the communication control thread 203. In the following description, processes including the data receiving process performed by the communication control thread 201 and the like may be hereinafter called "communication control processes." In FIG. 2, communication control 211 represents a communication control process performed by the communication control thread 201, and communication control 213 represents a communication control process performed by the communication control thread 201. The receiving processes in the communication control processes include polling to determine whether data is transmitted.

During execution of polling, the communication control thread 201 merely determines whether the memory region is updated, which makes it possible to limit use of resources of the CPU core 10, unlike in other communication control processes.

The CPU core 10 or the execution unit executing the communication control thread 201 has three operation modes, that is, a mode in which a communication control process other than polling such as a receiving process is executed, a mode in which polling is executed waiting for receipt, and a mode in which no communication control process is executed. In the following description, the operation mode in which polling is executed waiting for receipt will be called "mpoll," and the mode in which no communication control process is executed will be called "Idle." In the following description, the operation modes of the CPU core 10 or the execution unit executing the communication control thread 201 may be called simply operation modes of the communication control thread 201.

A memory region is assigned to the communication control thread 201. In the example, the memory region 122 of the memory 12 illustrated in FIG. 1 will be assigned to the communication control thread 201, for instance. The CPU core 10 or the execution unit executing the communication control thread 201 monitors that the memory region 122 is updated.

For example, in the case of using a CPU manufactured by Intel (registered trademark), the communication control thread 201 performs a polling process under a mwait instruction in the mpoll state. The mwait instruction is an instruction for stopping operations of the thread until a memory region at a designated address is updated. The memory region at a designated address is the memory region 122 assigned to the communication control thread 201 illustrated in FIG. 1, for example. Specifically, in the case of mpoll, when the memory region 122 is updated by the memory controller 15, the communication control thread 201 cancels stoppage of the operations and then returns to the mode in which a communication control process is executed. In addition, besides updating of the memory region 122, upon occurrence of an interrupt, the communication control thread 201 returns to the mode in which a communication control process is executed.

In the example, the CPUs 10 and 20 have two each threads for convenience of description, but there is no particular limitation on the number of threads as far as a plurality of threads is provided.

Figure 3:
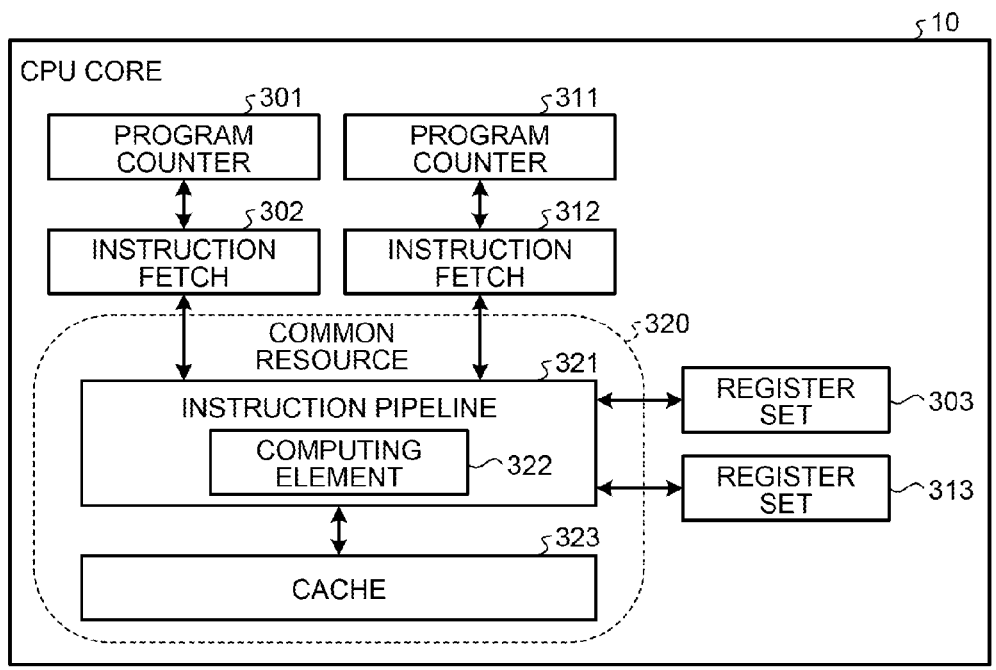
FIG. 3 is a diagram for describing resources of a CPU core used in the threads.

FIG. 3 is a diagram for describing resources of the CPU core used by threads. As illustrated in FIG. 3, there exist common resources 320 as resources used in common by the application thread 200 and the communication control thread 201 for their respective processes. The common resources 320 include an instruction pipeline 321 with a computing element 322, a cache 323, and the like.

The application thread 200 uses resources of the CPU core 10 such as a program counter 301, an instruction fetch 302, a register set 303, the instruction pipeline 321, and the cache 323, for example. The communication control thread 201 uses resources of the CPU core 10 such as a program counter 311, an instruction fetch 312, a register set 313, the instruction pipeline 321, and the cache 323, for example.

The common resources 320 are used by both the application thread 200 and the communication control thread 201. It is difficult for the other thread to use any of the common resources 320 used by one thread. For example, when the application thread 200 uses the computing element 322, it is difficult for the communication control thread 201 to use the computing element 322.

The CPU core 10 or the execution unit executing the application thread 200 and the communication control thread 201 has two resource consumption modes for determining the use status of resources of the CPU core 10, that is, a normal mode and a resource-saving mode. The resource-saving mode is a mode in which the use of resources of the CPU core 10 is suppressed. The normal mode is a mode in which the use of resources of the CPU core 10 is not suppressed. In particular, in the resource-saving mode, the use of the common resources 320 by the application thread 200 and the communication control thread 201 is also reduced. Accordingly, when one thread operates in the resource-saving mode, the use of the common resources 320 by the one thread is reduced, and thus the other thread can use the common resources 320 almost at any time to perform a process rapidly. In the following description, the resource consumption modes of the CPU core 10 or the execution unit executing the application thread 200 and the communication control thread 201 may be called simply the resource consumption modes of the threads.

The resource consumption modes can be implemented by using power-saving modes in CPUs produced by Intel (registered trademark), for example. Specifically, the CPUs produced by Intel are provided with modes C0 to C6 for power consumption. C0 is a mode in which a process is executed. C1 to C6 are power-saving modes for suppressing power consumption. In the modes C1 to C6, the larger the number is, the more the power consumption is suppressed. In the power-saving modes, the use of resources of the CPU core 10 is suppressed to decrease power consumption. Thus, the power-saving modes provided by Intel can be used as "resource-saving modes" in the example. However, when C2 to C6 in particular are used as resource-saving modes in the example, the recovery time for moving to the C0 mode for process execution will increase. This brings about increase of communication delay time in the modes C2 to C6. It is thus preferred to use the mode C1 as a "resource-saving mode" to reduce communication delay. In addition, the power-saving mode C0 provided by Intel is equivalent to the normal resource consumption mode in the example.

In the operation mode of Idle, the CPU core 10 or the execution unit executing the communication control thread 201 can move to the resource consumption mode. In the operation mode of mpoll, the communication control thread 201 can select the resource-saving mode or the other resource consumption mode at stoppage upon receipt of the waite instruction.

FIG. 4 is a diagram illustrating relationships between the resource consumption modes and the power-saving mode of the CPU core. As being indicated in column 400 of FIG. 4, when both of the application thread 200 and the communication control thread 201 operate in the resource-saving mode, the CPU core 10 moves to the power-saving mode. On the other hand, as indicated in columns other than the column 400, either the application thread 200 or the communication control thread 201 operates in the normal mode, the CPU core 10 is active and does not move to the power-saving mode. When the CPU core 10 moves to the power-saving mode, the operations of the computing unit and the like in the CPU core 10 are suppressed. That is, the operations of the common resources used by the application thread 200 and the communication control thread 201 may be suppressed. Accordingly, when the CPU core 10 moves to the power-saving mode, it takes time to activate the communication control thread 201 to increase a delay in the receiving process.

FIG. 5 is a diagram for describing relationships between the receiving processes and the application processes in the resource consumption modes.

When both the application thread 200 and the communication control thread 201 are in the normal mode, a delay in the receiving process by the communication control thread 201 is 0.77 μsec. In this case, the communication control thread 201 uses the common resources and the like to perform the process, and thus the application thread 200 deteriorates in performance of the application process.

When the communication control thread 201 is in the normal mode and the application thread 200 is in the resource-saving mode, a delay in the receiving process by the communication control thread is 0.73 μsec. Specifically, when the application thread 200 is in the resource-saving mode, a delay in the receiving process becomes shorter as compared to the case where both of the threads are in the normal mode. Accordingly, when the application thread 200 is not executing any process, moving the application thread 200 to the resource-saving mode allows the communication control thread 201 to perform the receiving process faster.

When the communication control thread 201 is in the resource-saving mode and the application thread 200 is in the normal mode, a delay in the receiving process is 1.03 μsec. In this case, the receiving process is performed after the communication control thread 201 moves to the normal mode, and thus the receiving process is delayed. However, the consumption of resources by the communication control thread 201 is reduced, which makes it possible to maintain the application processing performance of the application thread 200.

When both the communication control thread 201 and the application thread 200 are in the resource-saving mode, the CPU core 10 enters the power-saving mode as indicated in column 401, and a delay in the receiving process is 1.89 μsec. In this case, after the power-saving mode of the CPU core 10 is cleared, the communication control thread 201 enters the normal mode and starts the receiving process, and thus the delay in the receiving process becomes larger. In particular, the delay in the receiving process is very large as compared to the case where the communication control thread 201 is in the resource-saving mode and the application thread 200 is in the normal mode. Accordingly, to reduce the delay in the receiving process performed by the communication control thread 201, it is desired that at least either the communication control thread 201 or the application thread 200 is not moved to the resource-saving mode.

Accordingly, from the relationships between the application process and the receiving process in the resource-saving mode described in FIG. 5, the application thread 200 and the communication control thread 201 change their resource consumption modes according to their respective operation modes to meet table 500 in FIG. 6, for example. FIG. 6 is a diagram for describing one example of settings of the resource consumption modes of the threads according to example 1.

First, columns 501 to 505 grayed out in table 500 indicate the state in which the corresponding thread performs a process, and thus the resource consumption mode of the thread is set to the normal mode. For example, when the application thread 200 executes the application process, the application thread 200 is set in the normal mode as indicated in columns 501 to 503. When the communication control thread 201 performs the communication control process, the communication control thread 201 is set in the normal mode as indicated in columns 504 and 505.

When either the application thread 200 or the communication control thread 201 is in the normal mode, it is preferred to set the other thread in the resource-saving mode, if possible. First, in the case as indicated in columns 503 and 504, none of the threads can move to the resource-saving mode. In this case, both of the threads are operated in the normal mode. Meanwhile, when the communication control thread 201 does not execute the communication control process (hereinafter, called "Idle") but performs polling (hereinafter, called "mpoll"), the communication control thread 201 can move to the resource-saving mode. Thus, when the application thread 200 performs the application process and the communication control thread 201 is in the mpoll or Idle state, the communication control thread 201 is set in the resource-saving mode.

When the application thread 200 does not execute the application process (hereinafter, called "Idle"), the application thread 200 can move to the resource-saving mode. Thus, when the communication control thread 201 performs the communication control process and the application thread 200 is in the Idle state, the application thread 200 is set in the resource-saving mode.

When the application thread 200 is in the Idle state and the communication control thread 201 is in the Idle state, the application thread 200 is set in the normal mode and the communication control thread 201 is set in the resource-saving mode. In this case, since the communication control thread 201 is in the Idle state and does not perform the communication control process, the communication control thread 201 can be set in the resource-saving mode without any problem. Meanwhile, the application thread 200 is also in the Idle state and thus can be set in the resource consumption mode. However, when the application thread 200 moves to the resource-saving mode, the CPU core 10 enters the power-saving mode. To avoid this, the application thread 200 is set in the normal mode. As described above, the application thread 200 is in the normal mode and thus the CPU core 10 can be kept in the active state.

Next, when the application thread 200 is in the Idle state and the communication control thread 201 is in the mpoll state, the application thread 200 is set in the resource-saving mode and the communication control thread 201 is set in the normal mode. In this case, since the application thread 200 is in the Idle state and does not perform the application process, the application thread 200 can be set in the resource-saving mode without any problem. Meanwhile, the communication control thread 201 is in the mpoll state and thus may be set in the normal mode or the resource-saving mode. However, when the communication control thread 201 moves to the resource-saving mode, the CPU core 10 enters the power-saving mode. To avoid this, the communication control thread 201 is set in the normal mode. As described in the foregoing, the communication control thread 201 is in the normal mode and thus the CPU core 10 can be kept in the active state.

To realize the states of the resource consumption modes indicated in FIG. 6, the CPU core 10 or the execution unit executing the application thread 200 and the communication control thread 201 performs the following process. Specifically, when the operation mode moves from the mode in which the communication control process is executed or the mpoll state to the Idle state, the CPU core 10 or the execution unit executing the application thread 200 and the communication control thread 201 uses the OS to run an Idle routine to switch between the resource consumption mode. In addition, when the operation mode moves from the mode in which the communication control process is executed or the Idle state to the mpoll state, the CPU core 10 or the execution unit executing the communication control thread 201 uses OS to run a mpoll routine to switch between the resource consumption modes.

Here, operations of the CPU core 10 or the execution unit executing the application thread 200 during execution of the Idle routine will be described. The CPU core 10 or the execution unit executing the application thread 200 determines whether there is an application process in the ready state. This is because it is conceived that the application process may enter the ready state while switching to the Idle state takes place and the Idle routine is run. When there is a process in the ready state, the CPU core 10 or the execution unit executing the application thread 200 updates the memory region 122 assigned to the communication control thread 201. By doing this, the CPU core 10 or the execution unit executing the application thread 200 notifies the switching of the operation modes from the Idle state to the mode in which the application process is executed to the CPU core 10 or the execution unit executing the communication control thread 201. After that, the CPU core 10 or the execution unit executing the application thread 200 invokes a scheduler and waits for execution of the application process.

On the other hand, there is no process in the ready state, the CPU core 10 or the execution unit executing the application thread 200 determines whether its operation mode was the Idle state prior to the execution of the Idle routine. This is because the application thread 200 in the Idle state repeats the Idle routine due to occurrence of an interrupt or a change in the operation mode of the communication control thread 201 as described later. When the previous operation mode is not the Idle state, the CPU core 10 or the execution unit executing the application thread 200 updates the memory region 122 assigned to the communication control thread 201 to notify the change in its operation mode to the CPU core 10 or the execution unit executing the communication control thread 201. After that, the CPU core 10 or the execution unit executing the application thread 200 determines whether the operation mode of the communication control thread 201 is Idle. When the operation mode of the communication control thread 201 is Idle, the CPU core 10 or the execution unit executing the application thread 200 sets its resource consumption mode to the normal mode. On the other hand, when the operation mode of the communication control thread 201 is not Idle, the CPU core 10 or the execution unit executing the application thread 200 sets its resource consumption mode to the resource-saving mode.

After that, the CPU core 10 or the execution unit executing the application thread 200 waits until the memory region 121 assigned thereto is updated or an interrupt occurs due to a change in the operation mode of the communication control thread 201. When the memory region 121 is updated or an interrupt occurs, the CPU core 10 or the execution unit executing the application thread 200 repeats the Idle routine.

When moving to the mode in which the application process is executed, the CPU core 10 or the execution unit executing the application thread 200 sets its resource consumption mode to the normal mode.

Next, operations of the CPU core 10 or the execution unit executing the communication control thread 201 during execution of the Idle routine will be described. The CPU core 10 or the execution unit executing the communication control thread 201 determines whether there is a communication control process in the ready state. This is because it is conceived that the communication control process enters the ready state while switching to the Idle state takes place and the Idle routine is run. When there is a process in the ready state, the CPU core 10 or the execution unit executing the communication control thread 201 updates the memory region 121 assigned to the application thread 200. By doing this, the CPU core 10 or the execution unit executing the communication control thread 201 notifies the switching of the operation modes from the Idle state to the mode in which the application process is executed to the CPU core 10 or the execution unit executing the application thread 200. After that, the CPU core 10 or the execution unit executing the communication control thread 201 invokes a scheduler and waits for execution of the communication control process.

On the other hand, when there is no process in the ready state, the CPU core 10 or the execution unit executing the communication control thread 201 determines whether its operation mode was the Idle state prior to the execution of the Idle routine. This is because the communication control thread 201 in the Idle state repeats the Idle routine due to occurrence of an interrupt or a change in the operation mode of the application thread 200. When the previous operation mode is not the Idle state, the CPU core 10 or the execution unit executing the communication control thread 201 updates the memory region 121 assigned to the application thread 200 to notify the change in its operation mode to the CPU core 10 or the execution unit executing the application thread 200. After that, the CPU core 10 or the execution unit executing the communication control thread 201 sets its resource consumption mode to the resource-saving mode.

After that, the CPU core 10 or the execution unit executing the communication control thread 201 waits until the memory region 122 assigned thereto is updated or an interrupt occurs due to a change in the operation mode of the application thread 200. When the memory region 122 is updated or an interrupt occurs, the CPU core 10 or the execution unit executing the communication control thread 201 repeats the Idle routine.

Next, operations of the CPU core 10 or the execution unit executing the communication control thread 201 during execution of the mpoll routine will be described. The CPU core 10 or the execution unit executing the communication control thread 201 determines whether data from the CPU core 20 or 21 has reached. This is because it is conceived that data from the CPU core 20 or 21 reaches during switching to the mpoll state takes place and the mpoll routine is run. Then, when data has reached, the CPU core 10 or the execution unit executing the communication control thread 201 updates the memory region 121 assigned to the application thread 200, and notifies the switching of the operation mode from the mpoll state to the mode in which the communication control process is executed, to the CPU core 10 or the execution unit executing the application thread 200. After that, the CPU core 10 or the execution unit executing the communication control thread 201 performs the process of receiving the data.

On the other hand, when no data has reached, the CPU core 10 or the execution unit executing the communication control thread 201 determines whether its operation mode was mpoll prior to the mpoll routine. This is because the communication control thread 201 in the mpoll state repeats the mpoll routine due to occurrence of an interrupt or a change in the operation mode of the application thread 200. When the previous operation mode is not mpoll, the CPU core 10 or the execution unit executing the communication control thread 201 updates the memory region 121 assigned to the application thread 200 to notify the change in its operation mode to the CPU core 10 or the execution unit executing the application thread 200. Then, the CPU core 10 or the execution unit executing the communication control thread 201 sets its resource consumption mode to the resource-saving mode.

After that, the CPU core 10 or the execution unit executing the communication control thread 201 waits until the memory region 121 assigned thereto is updated or an interrupt occurs due to a change in the operation mode of the application thread 200. When the memory region 121 is updated or an interrupt occurs, the CPU core 10 or the execution unit executing the communication control thread 201 repeats the Idle routine.

When moving to the mode in which the communication control process is executed, the CPU core 10 or the execution unit executing the communication control thread 201 sets its resource consumption mode to the normal mode.

The memory controller 15 writes or reads data to or from the memory 12. For example, when data is sent from the CPU core 20 to the CPU core 10, the memory controller 15 updates the memory region 122 in the memory 12 assigned to the communication control thread 201. From the updating of the memory region 122 by the memory controller 15, the communication control thread 201 during polling detects receipt of the data and starts the receiving process of the data. Further, upon receipt of instructions from the communication control thread 201, the memory controller 15 updates the memory region 121 assigned to the application thread 200. In addition, upon receipt of instructions from the application thread 200, the memory controller 15 updates the memory region 122 assigned to the communication control thread 201.

Next, operations in the Idle routine of the application thread 200 according to the example will be described with reference to FIG. 7. FIG. 7 is a flow chart of operations in the Idle routine of the application thread according to example 1. The following description will be made as if each of the threads performs the process for easy understanding.

The application thread 200 determines whether there is an application process in the ready state (step S101).

When there is no process in the ready state (step S101: No), the application thread 200 determines whether its operation mode was Idle prior to the current Idle routine (step S102). When the previous operation mode is not Idle (step S102: No), the application thread 200 notifies the change in its operation mode to the communication control thread 201 (step S103). Specifically, the application thread 200 makes the notification to the communication control thread 201 by updating the memory region 121. Conversely, when the previous operation mode is Idle (step S102: Yes), the application thread 200 moves to step S104.

The application thread 200 determines whether the operation mode of the communication control thread 201 is Idle (step S104). When the operation mode of the communication control thread 201 is Idle (step S104: Yes), the application thread 200 sets its resource consumption mode to the normal mode (step S105). Conversely, when the operation mode of the communication control thread 201 is not Idle (step S104: No), the application thread 200 sets its resource consumption mode to the resource-saving mode (step S106).

After that, the application thread 200 determines whether the memory region 121 assigned thereto is updated or an interrupt has occurred due to a change in the operation mode of the communication control thread 201 (step S107). When the memory region 121 is not updated or no interrupt has occurred (step S107: No), the application thread 200 waits until the memory region 121 is updated or an interrupt occurs. Conversely, when the memory region 121 is updated or an interrupt has occurred (step S107: Yes), the application thread 200 returns to step S101.

On the other hand, when there is a process in the ready state (step S101: Yes), the application thread 200 notifies the switching of operation modes from Idle to the mode in which the application process is executed, to the communication control thread 201 (step S108). Specifically, the application thread 200 makes the notification to the communication control thread 201 by updating the memory region 122. After, the application thread 200 invokes a scheduler (step S109) and waits for execution of the application process.

Next, operations in the Idle routine of the communication control thread 201 according to the example will be described with reference to FIG. 8. FIG. 8 is a flow chart of operations in the Idle routine of the communication control thread according to the example 1. The following description will be made as if each of the threads performs the process for easy understanding.

The communication control thread 201 determines whether there is a communication control process in the ready state (step S201).

When there is no process in the ready state (step S201: No), the communication control thread 201 determines whether its operation mode was Idle prior to the current Idle routine (step S202). When the previous operation mode is not Idle (step S202: No), the communication control thread 201 updates the memory region 121 to notify the change in its operation mode to the application thread 200 (step S203). Conversely, when the previous operation mode is Idle (step S202: Yes), the communication control thread 201 moves to step S204.

The communication control thread 201 sets its resource consumption mode to the resource-saving mode (step S204).

After that, the communication control thread 201 determines whether the memory region 122 assigned thereto is updated or an interrupt has occurred due to a change in the operation mode of the application thread 200 (step S205). When the memory region 122 is not updated or no interrupt has occurred (step S205: No), the communication control thread 201 waits until the memory region 122 is updated or an interrupt occurs. Conversely, when the memory region 122 is updated or an interrupt has occurred (step S205: Yes), the communication control thread 201 returns to step S201.

On the other hand, when there is a process in the ready state (step S201: Yes), the communication control thread 201 notifies the switching of operation modes from Idle to the mode in which the communication control process is executed, to the application thread 200 (step S206). Specifically, the communication control thread 201 makes the notification to the application thread 200 by updating the memory region 121. After that, the communication control thread 201 invokes a scheduler (step S207) and waits for execution of the communication control process.

Figure 9:
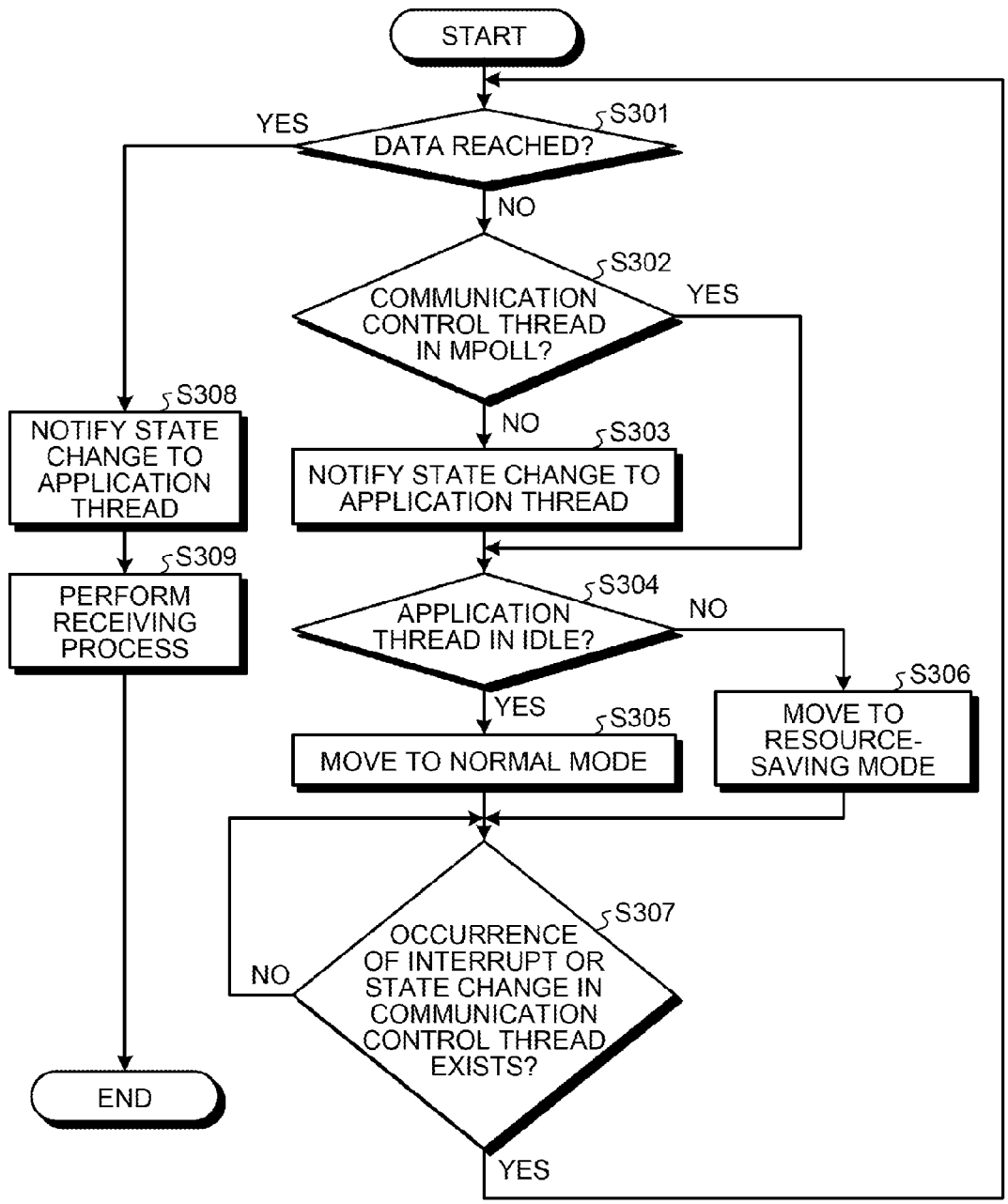
FIG. 9 is a flow chart of operations in mpoll routine of the communication control thread according to example 1.

Next, operations in the mpoll routine of the communication control thread 201 according to the example will be described with reference to FIG. 9. FIG. 9 is a flow chart of operations in the mpoll routine of the communication control thread according to example 1. The following description will be made as if each of the threads performs the process for easy understanding.

The communication control thread 201 determines whether data from the CPU core 20 or 21 has reached (step S301).

When no data has reached (step S301: No), the communication control thread 201 determines whether its operation mode was mpoll prior to the current mpoll routine (step S302). When the previous operation mode is not mpoll (step S302: No), the communication control thread 201 updates the memory region 121 to notify the change in its operation mode to the application thread 200 (step S303). Conversely, when the previous operation mode is mpoll (step S302: Yes), the communication control thread 201 moves to step S304.

The communication control thread 201 determines whether the operation mode of the application thread 200 is Idle (step S304). When the operation mode of the application thread 200 is Idle (step S304: Yes), the communication control thread 201 sets its resource consumption mode to the normal mode (step S305). Conversely, when the operation mode of the application thread 200 is not Idle (step S304: No), the communication control thread 201 sets its resource consumption mode to the resource-saving mode (step S306).

After that, the communication control thread 201 determines whether the memory region 122 assigned thereto is updated or an interrupt has occurred due to a change in the operation mode of the application thread 200 (step S307). When the memory region 122 is not updated or no interrupt has occurred (step S307: No), the communication control thread 201 waits until the memory region 122 is updated or an interrupt occurs. Conversely, when the memory region 122 is updated or an interrupt has occurred (step S307: Yes), the communication control thread 201 returns to step S301.

On the other hand, when there is a process in the ready state (step S301: Yes), the communication control thread 201 notifies the switching of operation modes from Idle to the mode in which the communication control process is executed, to the application thread 200 (step S308). Specifically, the communication control thread 201 makes the notification to the application thread 200 by updating the memory region 121. After, the communication control thread 201 performs the receiving process (step S309).

Figure 10:
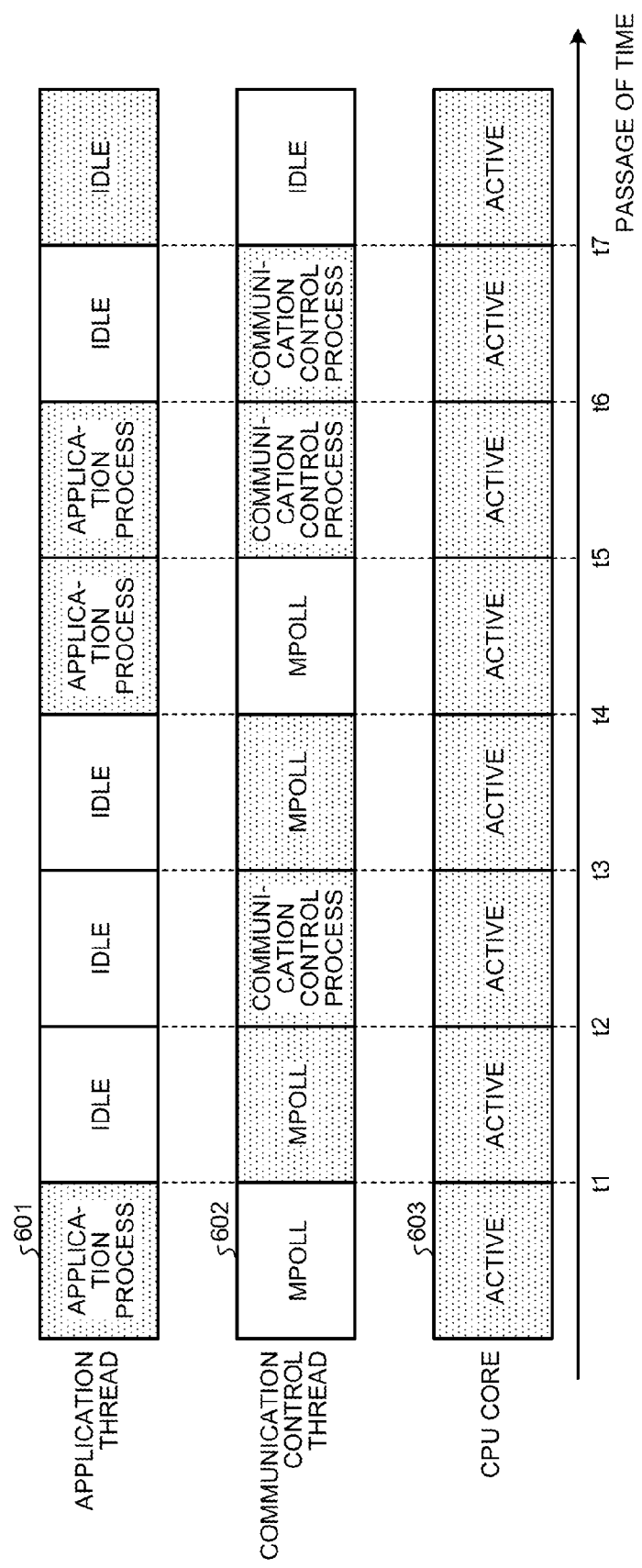
FIG. 10 is a time chart of one example of transitions of the threads in operation modes and resource consumption modes according to example 1.

Next, one example of transitions of the threads in the operation modes and the resource consumption modes will be described with reference to FIG. 10. FIG. 10 is a time chart indicating one example of transitions of the respective threads in the operation modes and the resource consumption modes according to example 1. A band graph 601 in FIG. 10 indicates transitions of the application thread 200 in the operation modes. A band graph 602 in FIG. 10 indicates transitions of the communication control thread 201 in the operation modes. A band graph 603 in FIG. 10 indicates transitions of the CPU core 10 in the power-saving mode. An arrow at the lowermost part of FIG. 10 indicates the passage of time. Cells grayed out in the band graphs 601 and 602 indicate that the resource consumption modes of the threads are the normal mode. Cells grayed out in the band graph 603 indicate that the CPU core 10 is not in the power-saving mode, that is, the CPU core 10 is in the active state. The following description will be made as if each of the threads performs the process for easy understanding.

Until time t1, the operation mode of the application thread 200 is the mode in which the application process is performed. In this state, the power-saving mode of the application thread 200 is the normal mode. The operation mode of the communication control thread 201 is mpoll. In this state, the power-saving mode of the communication control thread 201 is the resource-saving mode. In this case, since the application thread 200 is in the normal mode, the power-saving mode of the CPU core 10 is active.

Then, the application process of the application thread 200 is terminated at time t1. Accordingly, the operation mode of the application thread 200 moves to Idle. In addition, since the communication control thread 201 is mpoll, the application thread 200 sets its resource consumption mode to the resource-saving mode. Since the application thread 200 is in the Idle state and the communication control thread 201 is in the mpoll state, the communication control thread 201 sets its resource consumption mode to the normal mode. In this case, since the communication control thread 201 is in the normal mode, the power-saving mode of the CPU core 10 is active.

Next, data reaches from the CPU core 20 or 21 at time t2. Accordingly, the operation mode of the communication control thread 201 moves to the mode in which the communication control process such as the receiving process is executed. The resource consumption mode of the communication control thread 201 is already in the normal mode and thus does not change. In addition, the resource consumption mode of the application thread 200 also does not change from the resource-saving mode. In this case, since the communication control thread 201 is in the normal mode, the power-saving mode of the CPU core 10 is active.

Next, the communication control process is terminated at time t3. To wait for arrival of data, the operation mode of the communication control thread 201 moves to mpoll. Since the operation mode of the application thread 200 is Idle, the resource-saving mode of the communication control thread 201 is kept at the normal mode. The resource consumption mode of the application thread 200 is also kept at the resource-saving mode. In this case, since the communication control thread 201 is in the normal mode, the power-saving mode of the CPU core 10 is active.

Next, the application thread 200 starts the application process at time t4. Accordingly, the application thread 200 sets its resource consumption mode to the normal mode. In response to this, the communication control thread 201 in the operation mode of mpoll sets its resource consumption mode to the resource-saving mode. In this case, since the application thread 200 is in the normal mode, the power-saving mode of the CPU core 10 is active.

Next, data arrives from the CPU core 20 or 21 at time t5. Accordingly, the operation mode of the communication control thread 201 moves to the mode in which the communication control process such as the receiving process is executed. Then, the communication control thread 201 sets its resource consumption mode to the normal mode. At that time, since the application thread 200 is executing the application process, the application thread 200 keeps its resource consumption mode at the normal mode. In this case, since the application thread 200 and the communication control thread are both in the normal mode, the power-saving mode of the CPU core 10 is active.

Next, the application process is terminated and the operation mode of the application thread 200 moves to Idle at time t6. At that time, since the communication control thread 201 is executing the communication control process, the application thread 200 sets its resource consumption mode to the resource-saving mode. The communication control thread 201 keeps its resource consumption mode at the normal mode. In this case, since the communication control thread 201 is in the normal mode, the power-saving mode of the CPU core 10 is active.

Then, the communication control process is terminated and the operation mode of the communication control thread 201 moves to Idle at time t7. Since the operation mode of the application thread 200 is Idle, the communication control thread 201 sets its resource consumption mode to the resource-saving mode. Since the operation mode of the communication control thread 201 is Idle, the application thread 200 sets its resource-saving mode to the normal mode. In this case, since the application thread 200 is in the normal mode, the power-saving mode of the CPU core 10 is active.

As described in the foregoing, it is possible to improve the processing speed of the communication control process or the application process by setting either the application thread 200 or the communication control thread 201 in the resource-saving mode as much as possible. In addition, the CPU core 10 is always active and does not shift to the power-saving mode, which makes it possible to reduce a delay in the receiving process of the communication control thread 201.

Figure 11:
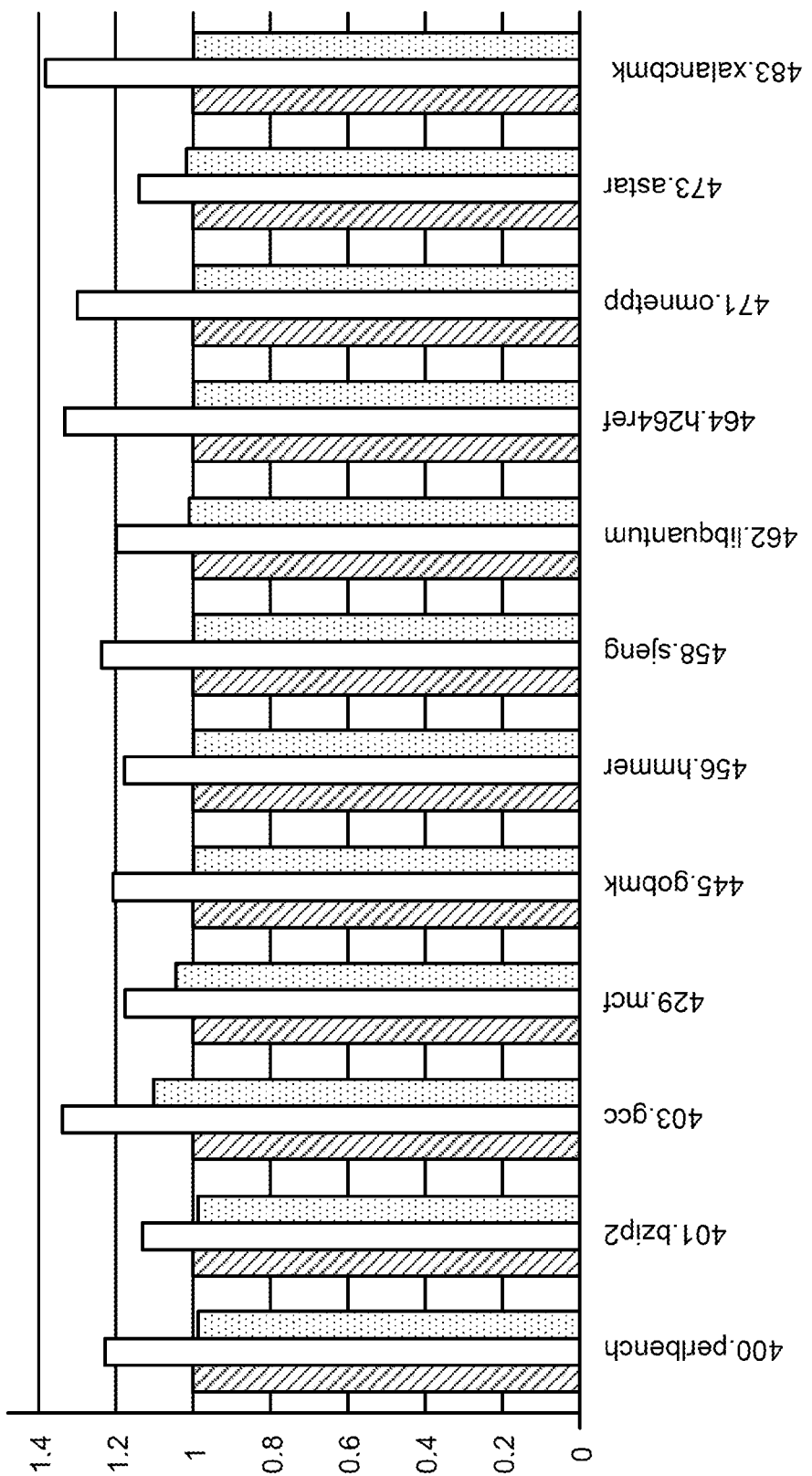
FIG. 11 is a diagram for describing influence of polling on the application processes.

FIG. 11 is a diagram for describing influence of polling on the application process. In FIG. 11, the vertical axis represents time and the lateral axis represents the kinds of benchmarks corresponding to the application process. Left-side graphs in the benchmarks on the lateral axis indicates the processing times of the benchmarks when no polling process is performed. Central graphs in the benchmark on the lateral axis indicate the processing times of the benchmarks when a simple busy polling is performed. The simple busy polling refers to polling with the use of a pause instruction for stopping the polling for several clocks during execution of the application process. Right-side graphs in the benchmarks on the lateral axis indicate the processing times of the benchmarks when polling is performed in the resource-saving mode. In addition, the times on the vertical axis are provided as values of processing times normalized by the processing times of the benchmarks without execution of polling.

As illustrated in FIG. 11, when a simple busy polling is performed, the processing times of the application process become very long, and the performance of the application process is deteriorated. Meanwhile, when polling is performed in the resource-saving mode, the processing times are shorter at all of the benchmarks as compared to the case where a simple busy polling is performed. Accordingly, when polling is to be performed while the application thread 200 executes the application process as in the example, it is possible to reduce deterioration in performance of the application process by setting the communication control thread 201 in the resource consumption mode.

As described in the foregoing, at the information processing device according to the example, when a thread executes a process, the CPU core of the execution unit executing another thread performing polling moves to the power-saving mode. This makes it possible to improve the speed of the process executed by a thread when another thread performs polling.

In addition, when the resource consumption mode of the CPU core or the execution unit executing any of threads is always set to the normal mode, it is possible to prevent the CPU core from moving to the power-saving mode and reduce a delay in the receiving process.

Further, when the CPU core or the execution unit executing a thread executes a process, it is possible to improve the executing speed of the process by moving the CPU core or the execution unit executing another thread to the resource-saving mode as much as possible. For example, when the CPU core or the execution unit executing the communication control thread performs polling, it is possible to reduce a delay in the receiving process by moving the CPU core or the execution unit executing the application thread to the resource-saving mode.

As described above, the information processing device according to the example makes it possible to suppress deterioration in performance of the application process while keeping high communication performance.

[b] Second Embodiment

Next, example 2 will be described. The information processing device according to the example is different from that in example 1 in that the CPU core or the execution unit executing the application thread is always set its resource-consuming mode to the normal mode. Thus, the following description will be made basically as to transitions of the CPU core or the execution unit executing the application thread and the communication control thread in the resource consumption modes. Descriptions of components having the same functions as those in the example 1 will be omitted here.

FIG. 12 is a diagram for describing one example of settings of the resource consumption modes of the threads according to the example 2. The CPU core or the execution unit executing the application thread 200 and the communication control thread 201 changes its resource consumption mode according to its operation mode, so as to meet conditions in table 510 of FIG. 12.

First, columns 511 to 515 grayed out in table 510 indicate that the corresponding threads perform processes and thus the resource consumption modes of the threads are set in the normal mode.

In the case of the example, as indicated in columns 516 to 518, even when the application thread 200 is in the Idle state, the CPU core or the execution unit executing the application thread 200 sets its resource consumption mode to the normal mode regardless of the operation mode of the communication control thread 201. As described above, when the CPU core or the execution unit executing the application thread 200 is always set in the normal operation mode, the CPU core 10 does not move to the power-saving mode but is always in the active state.

Accordingly, the CPU core or the execution unit executing the communication control thread 201 can set its resource consumption mode to the resource-saving mode, if possible, regardless of the transition of the CPU core 10 to the power-saving mode. Specifically, when the operation mode of the CPU core or the execution unit executing the communication control thread 201 is Idle or mpoll, the CPU core or the execution unit executing the communication control thread 201 sets its resource consumption mode to the resource-saving mode.

Then, when the operation mode of the CPU core or the execution unit executing the application thread 200 and the communication control thread 201 moves from the mode in which the communication control process is executed or mpoll to Idle, the CPU core or the execution unit executing the application thread 200 and the communication control thread 201 uses the OS to run an Idle routine to switch between the resource consumption modes. In addition, when the operation mode of the CPU core or the execution unit executing the communication control thread 201 moves from the mode in which the communication control process is executed or Idle to mpoll, the CPU core or the execution unit executing the communication control thread 201 uses the OS to run a mpoll routine to switch between the resource consumption modes. This realizes the states of the resource consumption modes indicated in FIG. 12.

Figure 13:
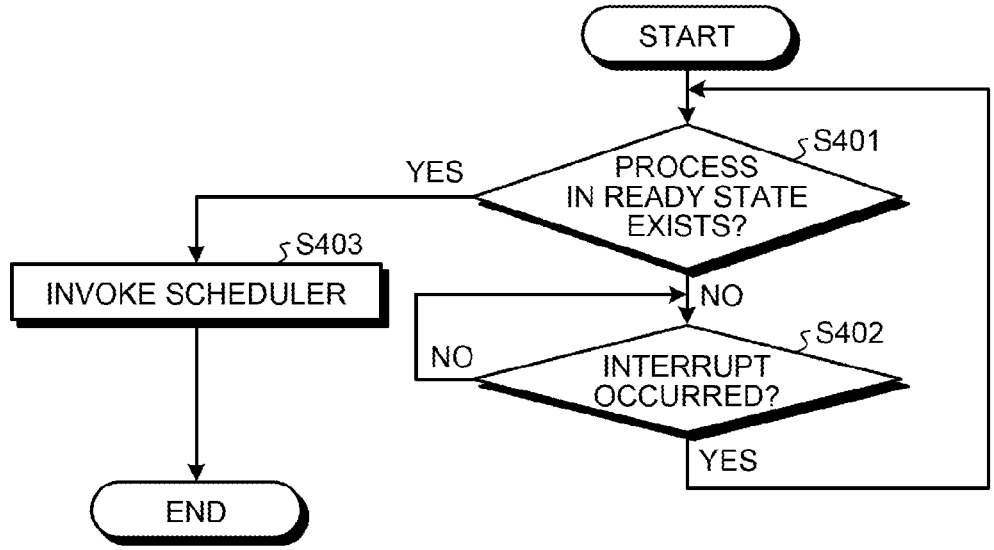
FIG. 13 is a flow chart of operations in Idle routine of an application thread according to example 2.

Next, operations in the Idle routine of the application thread 200 according to the example will be described with reference to FIG. 13. FIG. 13 is a flow chart of operations in the Idle routine of the application thread according to example 2. The following description will be made as if each of the threads performs the process for easy understanding.

The application thread 200 determines whether there is an application process in the ready state (step S401).

When there is no process in the ready state (step S401: No), the application thread 200 determines whether an interrupt has occurred (step S402). When no interrupt has occurred (step S402: No), the application thread 200 waits for occurrence of an interrupt. Conversely, when an interrupt has occurred (step S402: Yes), the application thread 200 returns to step S401.

On the other hand, when there is a process in the ready state (step S401: Yes), the application thread 200 invokes a scheduler (step S403) and waits for execution of the application process.

Figure 14:
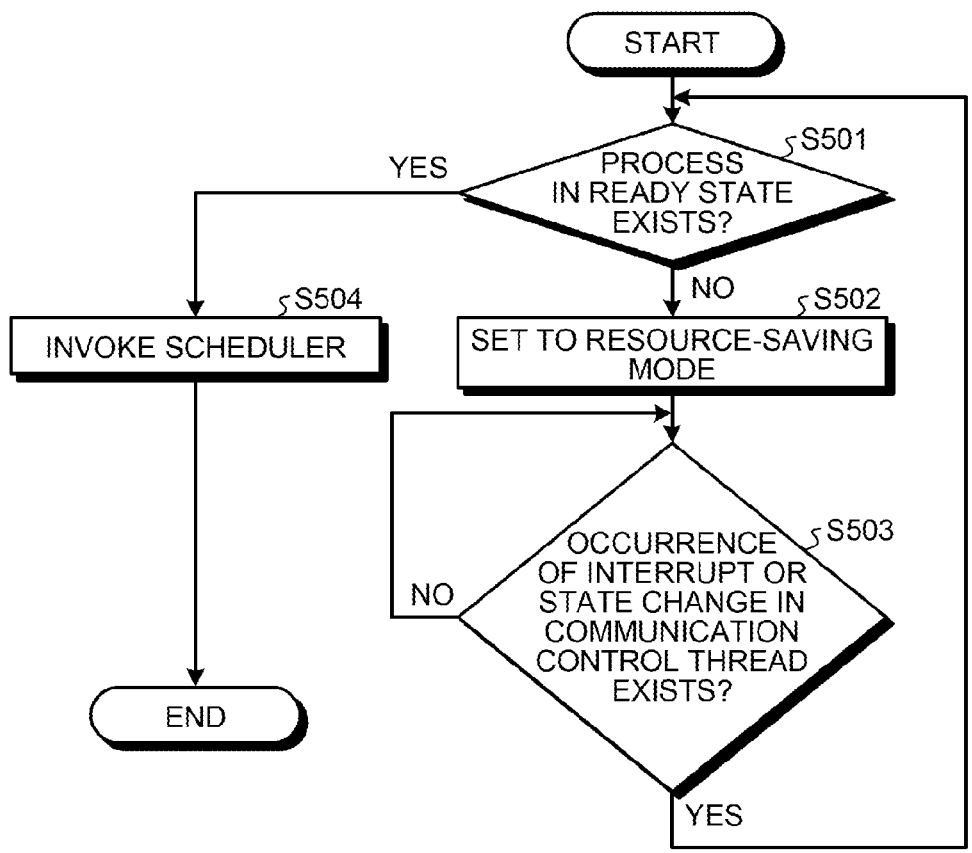
FIG. 14 is a flow chart of operations in Idle routine of a communication control thread according to example 2.

Next, operations in the Idle routine of the communication control thread 201 according to the example will be described with reference to FIG. 14. FIG. 14 is a flow chart of operations in the Idle routine of the communication control thread according to example 2.

The communication control thread 201 determines whether there is a communication control process in the ready state (step S501).

When there is no process in the ready state (step S501: No), the communication control thread 201 sets its resource consumption mode to the resource-saving mode (step S502).

After that, the communication control thread 201 determines whether the memory region 122 assigned thereto is updated or an interrupt has occurred (step S503). When the memory region 122 is not updated or no interrupt has occurred (step S503: No), the communication control thread 201 waits until the memory region 122 is updated or an interrupt occurs. Conversely, when the memory region 122 is updated or an interrupt has occurred (step S503: Yes), the communication control thread 201 returns to step S501.

On the other hand, when there is a process in the ready state (step S501: Yes), the communication control thread 201 invokes a scheduler (step S504) and waits for execution of the communication control process.

Figure 15:
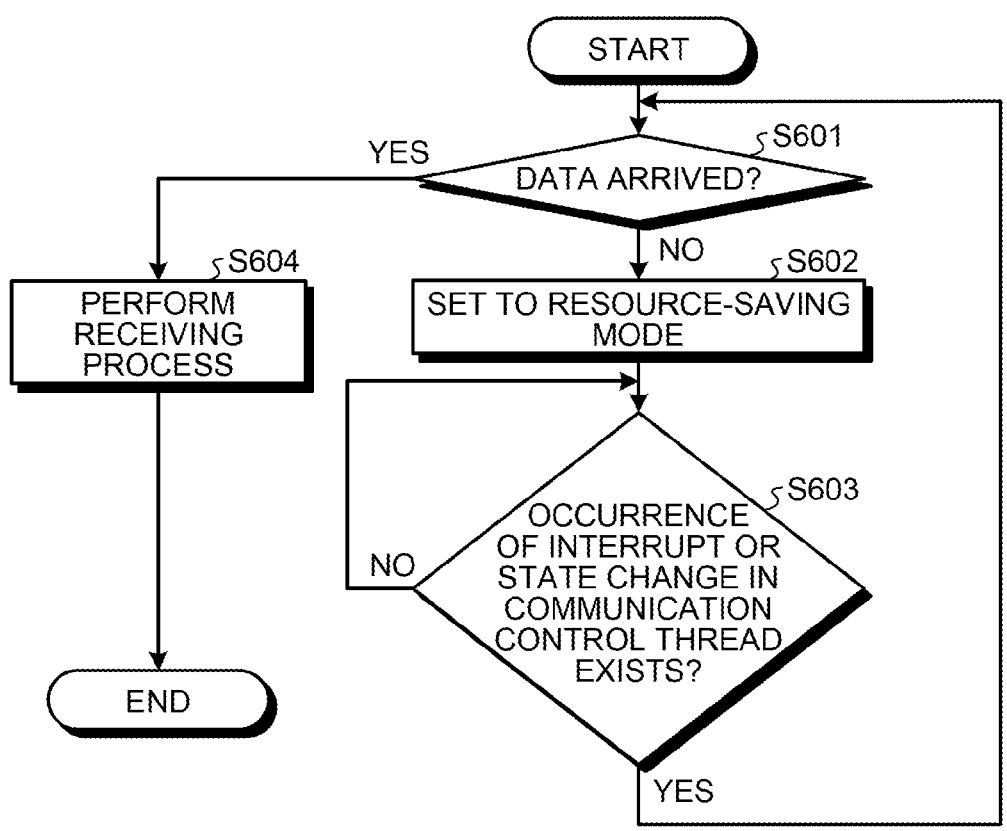
FIG. 15 is a flow chart of operations in mpoll routine of the communication control thread according to example 2.

Next, operations in the mpoll routine of the communication control thread 201 according to the example will be described with reference to FIG. 15. FIG. 15 is a flow chart of operations in the mpoll routine of the communication control thread according to example 2.

The communication control thread 201 determines whether data from the CPU core 20 or 21 has arrived (step S601).

When no data has arrived (step S601: No), the communication control thread 201 sets its resource consumption mode to the resource-saving mode (step S602).

After that, the communication control thread 201 determines whether the memory region 122 is updated or an interrupt has occurred (step S603). When the memory region 122 is not updated or no interrupt has occurred (step S603: No), the communication control thread 201 waits until the memory region 122 is updated or an interrupt occurs. Conversely, when the memory region 122 is updated or an interrupt has occurred (step S603: Yes), the communication control thread 201 returns to step S601.

On the other hand, when there is a process in the ready state (step S601: Yes), the communication control thread 201 performs the receiving process (step S604).

Figure 16:
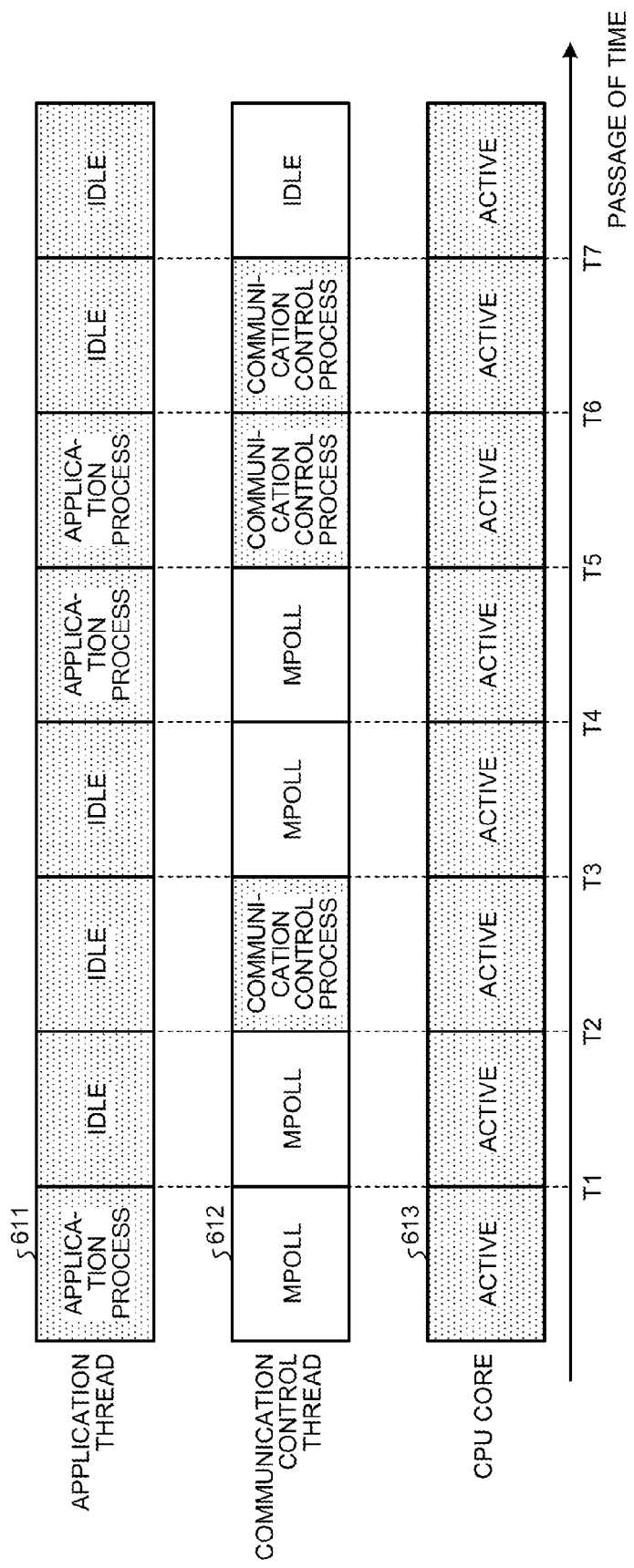
FIG. 16 is a time chart of one example of transitions of the threads in operation modes and resource consumption modes according to example 2.

Next, one example of transitions of the threads in the operation modes and the resource consumption modes will be described with reference to FIG. 16. FIG. 16 is a time chart indicating one example of transitions of the respective threads in the operation modes and the resource consumption modes according to example 2. A band graph 611 in FIG. 16 indicates transitions of the application thread 200 in the operation modes. A band graph 612 in FIG. 16 indicates transitions of the communication control thread 201 in the operation modes. A band graph 613 in FIG. 16 indicates transitions of the CPU core 10 in the power-saving mode. An arrow at the lowermost part of FIG. 16 indicates the passage of time. Cells grayed out in the band graphs 611 and 612 indicate that the resource consumption modes of the threads are the normal mode. Cells grayed out in the band graph 613 indicate that the CPU core 10 is not in the power-saving mode, that is, the CPU core 10 is in the active state. The following description will be made as if each of the threads performs the process for easy understanding.

When the operation mode of the application thread 200 moves to any of the modes, the resource consumption mode of the application thread 200 is kept at the normal mode as indicated in the band graph 611. Accordingly, the CPU core 10 is always in the active state as indicated in the band graph 613.

Meanwhile, until time T1, the operation mode of the communication control thread 201 is mpoll. In this state, the power-saving mode of the communication control thread 201 is the resource-saving mode.

Then, the application process of the application thread 200 is terminated at time T1. Accordingly, the operation mode of the application thread 200 moves to Idle. Meanwhile, the communication control thread 201 is in the mpoll state regardless of the operation mode of the application thread 200, and thus the communication control thread 201 keeps its resource consumption mode at the resource-saving mode.

Next, data from the CPU core 20 or 21 arrives at time T2. Accordingly, the operation mode of the communication control thread 201 moves to the mode in which the communication control process such as the receiving process is executed. In response to this, the communication control thread 201 sets its resource consumption mode to the normal mode.

Next, the communication control process is terminated at time T3, and the operation mode of the communication control thread 201 moves to mpoll to wait for arrival of data. Accordingly, the communication control thread 201 sets its resource consumption mode to the resource-saving mode.

Next, the application thread 200 starts the application process at time T4. At that time, the communication control thread 201 of which the operation mode is mpoll, keeps its resource consumption mode at the resource-saving mode.

Next, data arrives from the CPU core 20 or 21 at time T5. Accordingly, the operation mode of the communication control thread 201 moves to the mode in which the communication control process such as the receiving process is executed. Then, the communication control thread 201 sets its resource consumption mode to the normal mode.

Next, the application process is terminated and the operation mode of the application thread 200 moves to Idle at time T6. Conversely, the communication control thread 201 is executing the communication control process and thus keeps its resource consumption mode at the normal mode.

Then, the communication control process is terminated and the operation mode of the communication control thread 201 moves to Idle at time T7. The communication control thread 201 sets its resource consumption mode to the resource-saving mode regardless of the operation mode of the application thread 200.

As described in the foregoing, at the information processing device according to the example, when the CPU core or the execution unit executing a thread executes a process, another thread performing polling moves to the resource-saving mode. This makes it possible to improve the processing speed of the process executed by a thread when the CPU core or the execution unit executing another thread performs polling. In addition, it is possible to prevent the CPU core from moving to the power-saving mode and reduce a delay in the receiving process by setting always its resource consumption mode of the CPU core or the execution unit executing the application thread in the normal mode.

In addition, when it is possible to set always the application thread in the normal mode and move the communication control thread to the resource-saving mode, the communication control thread is set in the resource-saving mode, which allows easier control as compared to the case in example 1.

In the foregoing examples, to reduce a delay in the receiving process as much as possible, the resource consumption mode of the CPU core or the execution unit executing any of the threads is set in the normal mode so as to keep the CPU core in the active state. Alternatively, depending on the degree of allowance of a delay in the receiving process, control may be performed so as to allow setting the CPU core or the execution unit executing all of the threads in the resource-saving mode. In that case, also, when the CPU core or the execution unit executing a thread executes a process, the CPU core or the execution unit executing another thread performing polling moves to the power-saving mode. Accordingly, it is possible to obtain the advantage of improving the speed of the process executed by the CPU core or the execution unit executing a thread when the CPU core or the execution unit executing another thread performs polling.

Figure 17:
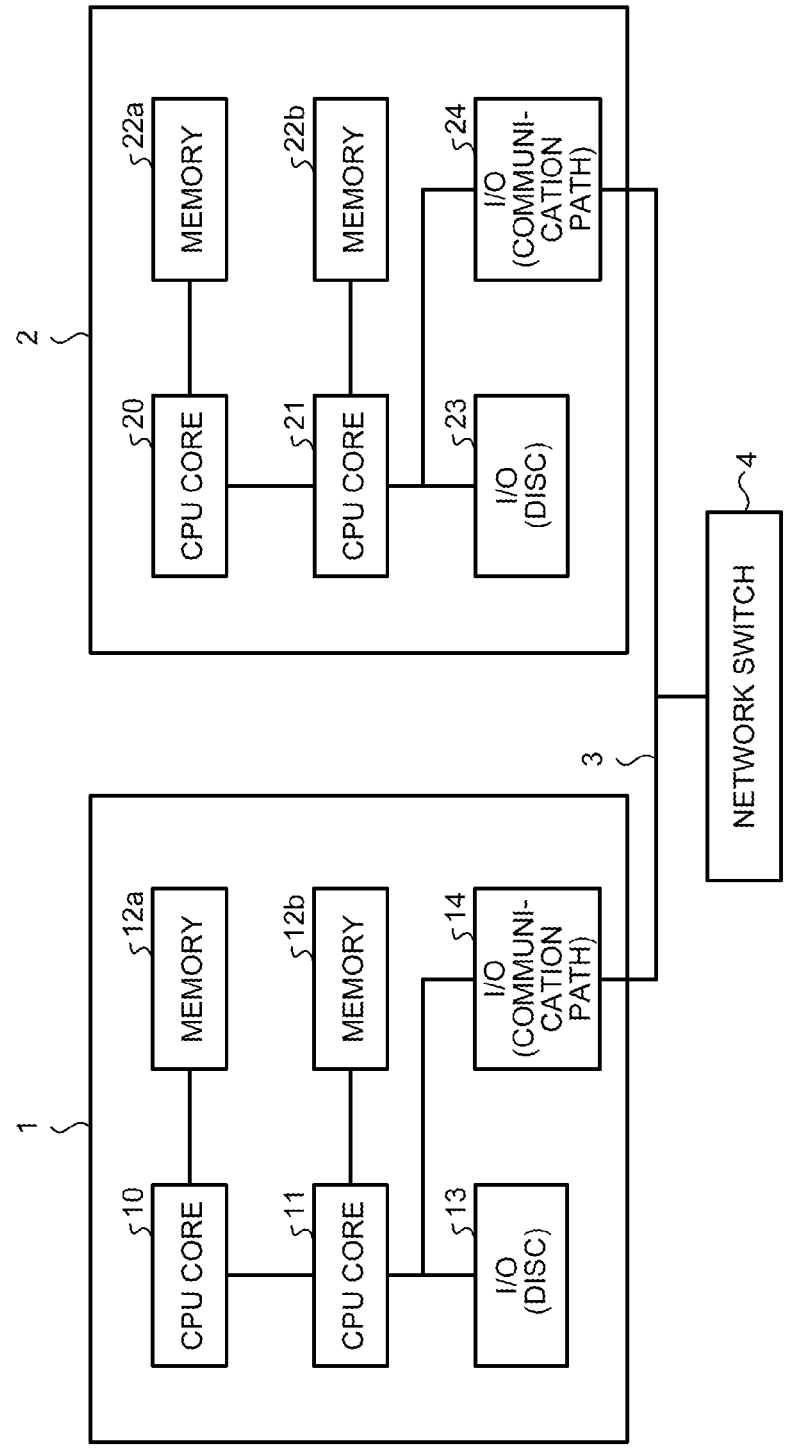
FIG. 17 is a configuration diagram illustrating another configuration of an information processing system.

Although, in the foregoing description, the information processing system has the system configuration illustrated in FIG. 1, other system configuration may be used. FIG. 17 is a configuration diagram illustrating another configuration of the information processing system. In FIG. 17, the memory controller 15 and the I/O bridge 16 in FIG. 1 are incorporated in the CPU cores 10 and 11. In addition, the memory controller 25 and the I/O bridge 26 are incorporated in the CPU cores 20 and 21.

In this case, the CPU core 10 is connected to a memory 12a. The memory controller contained in the CPU core 10 reads or writes data from or into the memory 12a. The CPU core 11 is connected to a memory 12b. The memory controller contained in the CPU core 11 reads or writes data from or into the memory 12b. And, the CPU core 20 is connected to a memory 22a. The memory controller contained in the CPU core 20 reads or writes data from or into the memory 22a. The CPU core 21 is connected to a memory 22b. The memory controller contained in the CPU core 21 reads or writes data from or into the memory 22b.

The CPU cores 10 and 11 are connected to the I/O 13 and the I/O 14 by internal I/O buses. The CPU cores 10 and 11 conduct communications with the I/O 13 and the I/O 14 via the internal I/O buses.

As described above, in the system configuration in which the memory controller and the I/O buses are incorporated in the CPU cores, the foregoing functions can be provided and the same advantages as described above can be produced.

According to one aspect of an information processing device, a method for controlling an information processing device, and a program for controlling an information processing device disclosed in the subject application, it is possible to produce the advantage of maintaining high communication performance and suppressing deterioration in application processing capacity.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
 a plurality of computing units that executes a plurality of threads including a communication control thread to which a receiving process by polling is assigned,
 the communication control thread has operational states of the computing unit executing the communication control thread, that is, a stopped state, a reception waiting state in which polling in a memory region indicating notification of arrival of data is performed and execution of the receiving process is waited for until arrival of data, and a process executing state in which data has arrived and the receiving process is performed, an application thread to which an application executing process other than the receiving process is assigned has operational states of the computing unit executing the application thread, that is, a waiting state and an application executing state in which an assigned process is performed, and when the computing unit executing the communication control thread is in the process executing state and the computing unit executing the application thread is not in the application executing state, the computing unit executing the application thread moves to a resource-saving mode from which a recovery time for move to a normal mode is shortest in a plurality of predetermined resource-saving modes in which the use of physical resources is suppressed, when the computing unit executing the application thread is in the application executing state and the computing unit executing the communication control thread is not in the process executing state, the computing unit executing the communication control thread moves to the resource-saving mode, when the computing unit executing the application thread is in the waiting state and the computing unit executing the communication control thread is in the stopped state, the computing unit executing the communication control thread moves to the resource-saving mode, and when the computing unit executing the application thread is in the waiting state and the computing unit executing the communication control thread is in the reception waiting state, the computing unit executing the application thread moves to the resource-saving mode.

2. The information processing device according to claim 1, wherein of the plurality of computing units, the computing unit executing the communication control thread is assigned with a predetermined region in a memory, and when the predetermined region is updated, the computing unit executing the communication control thread determines that data has arrived and then starts the receiving process.

3. The information processing device according to claim 1, wherein a computing unit executing any one of the plurality of threads does not move to the resource-saving mode.

4. The information processing device according to claim 1, wherein the computing unit executing the communication control thread has as an operational state a process executing state in which data has arrived and the receiving process is performed, the computing unit executing the application thread does not move to the resource-saving mode, and when being in a state other than the process executing state, the computing unit executing the communication control thread moves to the resource-saving mode.

5. A method of controlling an information processing device, the method comprising:

deciding a computing unit to execute a communication control thread to which a receiving process by polling in a memory region indicating notification of arrival of data is assigned and a computing unit to execute an application thread to which an application executing process other than the receiving process in a plurality of computing units executing a plurality of threads including the communication control thread, by any of the plurality of computing units in the information processing device, the communication control thread having operational states of the computing unit executing the communication control thread, that is, a stopped state, a reception waiting state in which polling is performed and execution of the receiving process is waited for until arrival of data, and a process executing state in which data has arrived and the receiving process is performed, the application thread having operational states of the computing unit executing the application thread, that is, a waiting state and an application executing state in which an assigned process is performed;

moving the decided computing unit executing the application thread to a power-saving resource mode from which a recovery time for move to a normal mode is shortest in a plurality of predetermined resource-saving modes in which the use of physical resources is suppressed when the decided computing unit executing the communication control thread is in the process executing state and the decided computing unit executing the application thread is not in the application executing state, the computing unit executing the application thread moves to the resource-saving mode;

moving the decided computing unit executing the communication control thread to a power-saving resource mode when the decided computing unit executing the application thread is in the application executing state and the decided computing unit executing the communication control thread is not in the process executing state;

moving the decided computing unit executing the communication control thread to a power-saving resource mode when the decided computing unit executing the application thread is in the waiting state and the decided computing unit executing the communication control thread is in the stopped state; and moving the decided computing unit executing the application thread to a power-saving resource mode when the decided computing unit executing the application thread is in the waiting state and the decided computing unit executing the communication control thread is in the reception waiting state.

6. A non-transitory computer-readable recording medium having stored therein a program for controlling an information processing device causing a computer to execute a process comprising:

deciding a computing unit to execute a communication control thread to which a receiving process by polling in a memory region indicating notification of arrival of data is assigned and a computing unit to execute an application thread to which an application executing process other than the receiving process in a plurality of computing units executing a plurality of threads including the communication control thread, by any of the plurality of computing units in the information processing device, the communication control thread having operational states of the computing unit executing the communication control thread, that is, a stopped state, a reception waiting state in which polling is performed and execution of the receiving process is waited for until arrival of data, and a process executing state in which data has arrived and the receiving process is performed, the application thread having operational states of the computing unit executing the application thread, that is, a waiting state and an application executing state in which an assigned process is performed;

moving the decided computing unit executing the application thread to a power-saving resource mode from which a recovery time for move to a normal mode is shortest in a plurality of predetermined resource-saving modes in which the use of physical resources is suppressed when the decided computing unit executing the communication control thread is in the process executing state and the decided computing unit executing the application thread is not in the application executing state, the computing unit executing the application thread moves to the resource-saving mode;

moving the decided computing unit executing the communication control thread to a power-saving resource mode when the decided computing unit executing the application thread is in the application executing state and the decided computing unit executing the communication control thread is not in the process executing state;

moving the decided computing unit executing the communication control thread to a power-saving resource mode when the decided computing unit executing the application thread is in the waiting state and the decided computing unit executing the communication control thread is in the stopped state; and moving the decided computing unit executing the application thread to a power-saving resource mode when the decided computing unit executing the application thread is in the waiting state and the decided computing unit executing the communication control thread is in the reception waiting state.

* * * * *